United States Patent [19]

Ishihara

[11] Patent Number: 5,608,867
[45] Date of Patent: Mar. 4, 1997

[54] DEBUGGING SYSTEM USING VIRTUAL STORAGE MEANS, A NORMAL BUS CYCLE AND A DEBUGGING BUS CYCLE

[75] Inventor: Toshinori Ishihara, Kanagawa, Japan

[73] Assignee: NEC Corporation, Tokyo, Japan

[21] Appl. No.: 223,654

[22] Filed: Apr. 5, 1994

[30] Foreign Application Priority Data

Apr. 5, 1993 [JP] Japan ................................. 5-077305

[51] Int. Cl.$^6$ ................................................. G06F 11/30
[52] U.S. Cl. .............................. 395/184.01; 395/183.01; 395/183.19
[58] Field of Search ........................ 395/183.01, 183.19, 395/183.2, 183.21, 184.01; 364/267, 267.91, 267.8, 264.7

[56] References Cited

U.S. PATENT DOCUMENTS

| | | | |
|---|---|---|---|
| 4,047,243 | 9/1977 | Dijkstra | 364/200 |
| 4,264,954 | 4/1981 | Douglas et al. | 364/200 |
| 4,481,573 | 11/1984 | Fukunaga et al. | 364/200 |
| 4,602,329 | 7/1986 | Ohtake | 364/200 |
| 4,762,447 | 3/1988 | Duvall et al. | 364/200 |
| 4,965,720 | 10/1990 | Mitchell et al. | 364/200 |
| 5,361,340 | 11/1994 | Kelly et al. | 395/400 |

*Primary Examiner*—Hoa T. Nguyen
*Attorney, Agent, or Firm*—Whitham, Curtis, Whitham & McGinn

[57] ABSTRACT

A debugging system is adapted to perform debugging by employing a virtual address in a computer system which includes a microprocessor incorporating a virtual storage function and a function for outputting a normal bus cycle corresponding to a real address in a normal operation and a function for outputting a debugging bus cycle corresponding to a virtual address. The microprocessor outputs a signal indicative of a kind of access and a signal indicative of an outputting state of a virtual address during outputting of the virtual address in the debugging bus cycle. A memory device is connected to the microprocessor through an address bus and a data bus. The debugging system includes a bus monitoring means for monitoring output of the processor, the output from bus cycles and transfer data. The bus monitoring means includes a debugging means for performing the debugging process associated with the virtual address.

14 Claims, 8 Drawing Sheets ns by the
5,608,867

DEBUGGING SYSTEM USING VIRTUAL STORAGE MEANS, A NORMAL BUS CYCLE AND A DEBUGGING BUS CYCLE

BACKGROUND OF THE INVENTION

1. Field of the Invention

The present invention relates to a debugging system for a computer system. More specifically, the invention relates to a debugging system adapted to a computer system employing a microprocessor incorporating a virtual storage management function for converting a virtual address into a real address.

2. Description of the Related Art

In the modern computer systems, there are several types of virtual address management systems for realizing required greater address space. One of the typical virtual address systems has been known as a paging system. In the paging system, a virtual address and a real address are divided into the same size unit which is referred to as a "page". Normally, each page may have a capacity in the order of 4K bytes. The upper address of each address is used to identify of a page number. Assuming the page number of the virtual address is n, the page number n in question is mapped in the page number N of the corresponding real address.

For instance, the virtual address space is greater than the real address as such when the virtual address is 4 G ($2^{32}$) bytes, the real address space is 16M ($2^6$) bytes. Therefore, by assigning the one page of the real address to a plurality of pages of the virtual address, corelation between the virtual address space and the real address space is established. The mechanism for establishing a correlation between the virtual address space and the real address space is a virtual storage management mechanism.

The virtual storage management system has been typically in a form of a separate device out of a microprocessor outputting the address bus as the virtual address for large device scale. In such a system, for significant delay between the devices, loss factor in address conversion becomes large to causes degradation of performance of the system.

On the other hand, in the recent years, for development of the semiconductor integration technologies, it becomes typical to incorporate such virtual storage management mechanism within the microprocessor main frame. Therefore, the virtual address which is originally unnecessary as external operation of the microprocessor, is not output from the microprocessor. In the system employing the microprocessor incorporating the virtual storage management mechanism, a debugging system is normally employed for debugging the system.

In general, when a programmer prepares a program, the program is described only using the virtual address. Accordingly, at the verification stage by the programmer for verifying the program operation, analysis of error, enhancement of the performance and so forth, it is not possible to efficiently perform the operation by using only output of the microprocessor corresponding to the real address. Therefore, in order to improve efficiency, the debugging operation is normally performed with employing the debugging system and using the virtual addresses which are not output from the microprocessor.

Methods for performing debugging operation include a tracing method for tracing the operation expected by the program in order and a trapping method for verifying if the program will execute an expected operation when a specific address is accessed.

In the tracing method, a bus cycle issued by the microprocessor is monitored for checking whether the program is executed with an expected sequence and whether correct data transmission and reception is performed, according to an elapsed time. At this time, the contents to be monitored are a kind of bus cycle, output address and transferred read/write data and so forth.

In the trapping method, the bus cycle issued by the microprocessor is monitored and providing a program for causing branching upon access of a specific address which is preliminarily set by the programmer and outputting of an internal condition to be verified to the branching destination, for checking whether the preliminarily expected process is executed or not. At this time, the contents to be checked includes information of an internal cache which can be output, data of a general purpose register, data of a microprocessor control register, a resuming swapped by the microprocessor for resumption of an interrupted process by trapping and so forth.

As a method for realizing such a debugging system, there is a method, in which a special microprocessor (hereinafter referred to as "debugging processor") for outputting the virtual address instead of outputting of the real address. FIG. 6 is a block diagram showing a construction of the debugging system employing such a debugging processor. In FIG. 6, the debugging system includes a microprocessor 601, a debugging processor 602, a memory device 603 and a bus monitoring device 604.

The microprocessor 601 is connected to the memory device 603 via the address bus 6005 and the data bus 6006, and forms one microprocessor application system.

To the address bus 6005, the real address is output from the microprocessor 601. In the debugging processor 602 which uses the data bus 6006 in common with the microprocessor, does not drive the address bus 6005 during data read/write cycle. On the other hand, the debugging processor 602 generally performs the same operation as the microprocessor except for outputting of the virtual address to a virtual address bus 6010 as the address. Namely, the microprocessor 601 and the debugging processor 602 operate to perform the same operation at the same time with complete synchronization therebetween.

In the bus monitoring device 604, sampling is performed for the address on the virtual address bus 6010 and the signal 6001 indicative of the kind of data bus cycle of the data bus 6006, the read/write signal 6002, the data access signal 6003 and the bus cycle start signal 6004.

FIG. 7 shows a construction of a trace circuit included within the bus monitoring device 604. The trace circuit comprises a trace memory device 701, a counter 714 and an AND circuit 702. In this trace circuit, the signal 6001 indicative of the kind of the kind of the data access of the virtual address bus 6010, the read/write signal 6002, the bus cycle start signal 6004, the read/write data of the data bus 6006 are sampled with a bus cycle clock 7011, to which the read/write data of the data bus 6006 is input via an inverter 703, per each clock and stored in the trace memory device 701. It should be appreciated that the reference number 7012 is a trace start signal.

FIG. 8 shows a construction of a trap circuit to be incorporated in the bus monitoring device 604. The trap circuit comprises a trap address register 801, a comparator 802, and a flip-flop 803. In the trap address register 801, the virtual address for trapping is set with a trap address 8001 and a trap set signal 8002. The set virtual address and the virtual address bus 6010 are compared in the comparator 802. When both virtual addresses matches, a matching signal 8005 is output and input to the flip flop 803. From the flip flop 803, s trap demand signal is output on the basis of a clock 6011 input via an inverter 804. The trap demand signal 8007 is input to the microprocessor 601 and the debugging processor 602. By this, the trapping function of the bus monitoring device 604 can be realized.

In the above-mentioned conventional debugging system, since the real address is output from the microprocessor, in which the debugging system is incorporated, it is not possible to monitor the bus cycle in the virtual address.

On the other hand, in the case where the debugging processor is provided in parallel to the microprocessor in order to enable monitoring of the bus cycle in the virtual address, extra device having substantially the same function, construction to the microprocessor becomes necessary. Therefore, it causes high cost in construction.

Furthermore, due to tolerance in manufacturing of the devices, it is very difficult to establish complete matching between the microprocessor and the debugging processing in the set-up period and delay period and so forth.

In particularly to the second problem, when the debugging system is operated at a high frequency range, such as 33 MHz, it becomes inherently necessary to provide a debugging processor which can establish good matching with the microprocessor. When this condition is not satisfied, it becomes impossible to establish synchronization between the microprocessor and the debugging processor and impossible to execute the debugging process by the debugging system.

SUMMARY OF THE INVENTION

It is an object of the present invention to provide a debugging system which can eliminate the necessity of a special debugging processor which has been required otherwise, and thus can realize lower system cost.

Another object of the present invention is to provide a debugging system which can eliminates necessity for the special debugging processor which has been required for debugging using the virtual address in the prior art, and thereby eliminate necessity of establishing matching between the microprocessor and the debugging processor.

In order to accomplish the above-mentioned and other objects, according to one aspect of the invention, a debugging system for debugging employing a virtual address in a computer system comprises:

a microprocessor incorporating a virtual storage function and having a function for outputting a normal bus cycle corresponding to a real address in a normal operation and a function for outputting a debugging bus cycle corresponding to a virtual address output during debugging, the microprocessor outputting a signal indicative of a kind of access and a signal indicative of an outputting state of a virtual address during outputting of the virtual address in the debugging bus cycle;

a memory device connected to the microprocessor at least through an address bus and a data bus; and a bus monitoring device monitoring the bus cycle, address, transfer data and other signals issued by the microprocessor and including a trace circuit for storing trace data including the virtual address and the transfer data in order when the signal indicative of the outputting state of the virtual address upon outputting of the virtual address from the microprocessor.

In the preferred construction, the trace circuit comprises:

a trace data storage means for storing the trace data output in the debugging bus cycle;

a virtual address storage means for temporarily holding the virtual address output in the debugging cycle;

setting means responsive to the signal indicative of the kind of access and the signal indicative of the outputting state of the virtual address output in the debugging cycle for outputting a set signal for storing the virtual address in the virtual address storage means;

a trace address outputting means for generating an address for storing the trace data including the virtual address stored in the virtual address storage means, in the trace data storage means, during the normal bus cycle; and means for outputting an access signal commanding storage of the trace data to the trace data storage means.

The virtual address storage means for temporarily storing the virtual address of the trace circuit comprises:

an instruction fetching page number storage means for storing a virtual address for instruction fetching output in connection with access of an instruction fetch among the virtual page numbers of the virtual address; and a data accessing page number storage means for storing the virtual page number for data access output in connection with access of data among the virtual page numbers of the virtual address.

Also, the trace circuit may further comprise a virtual address selection output means for outputting the virtual address stored in the virtual address storage means to the trace data storage means on the basis of the signal indicative of the kind of access and the signal indicative of the outputting state of the virtual address, during the normal bus cycle.

The virtual address storage means for storing the virtual address of the trace circuit may comprise:

an instruction fetching page number storage means for storing a virtual address for instruction fetching output in connection with access of an instruction fetch among the virtual page numbers of the virtual address; and a data accessing page number storage means for storing the virtual page number for data access output in connection with access of data among the virtual page numbers of the virtual address;

the setting means for outputting a set signal for storing the virtual address in the virtual address storage means stores the virtual page number for instruction fetching output in connection with the access of instruction fetch in the instruction fetching page number storage means when the signal indicative of the kind of access indicates instruction fetching; and stores the virtual page number for data access output in connection with the data access in the data access page number storage means when the signal indicative of the kind of access indicates data access. Also, the virtual address selection output means for outputting the virtual address to the trace data storage means during normal bus cycle, may output to the trace data storage means one of the virtual page number of the instruction fetching page number storage means, the virtual page number of the data access page number storage means and the virtual page number corresponding to the access other than instruction fetch access and data access and the virtual address and a real address match to each other.

According to another aspect of the invention, a debugging system for debugging employing a virtual address in a computer system comprises:

a microprocessor incorporating a virtual storage function and having a function for outputting a normal bus cycle corresponding to a real address in a normal operation and a function for outputting a debugging bus cycle corresponding to a virtual address output during debugging, the microprocessor outputting a signal indicative of a kind of access and a signal indicative of an outputting state of a virtual address during outputting of the virtual address in the debugging bus cycle;

a memory device connected to the microprocessor at least through an address bus and a data bus for forming a system together with the microprocessor;

a bus monitoring device connected to the microprocessor through at least to the address bus and the data bus, monitoring the bus cycle, and including a trap circuit outputting a trap demand signal to the microprocessor at a time where a predetermined trap address matches with the virtual address in the normal bus cycle.

In the preferred construction, the trace circuit comprises:

a virtual address storage means for temporarily storing the virtual address output in the debug bus cycle;

a setting means for outputting a set signal for storing the virtual address to the virtual address storage means on the basis of the signal indicative of the kind of access and the signal indicative of the outputting state of the virtual address, output in the debug bus cycle;

a trap address storage means for setting the trap address for trapping the microprocessor;

a comparing means for comparing the virtual address stored in the virtual address storage means and a trap address stored in the trap address storage means, in the normal bus cycle; and a trap demand signal output means for outputting a trap demand signal to the microprocessor when addresses match as the result of comparison by the comparing means.

The debugging system may further comprise a virtual address selection outputting means for outputting the virtual address stored in the virtual address storage means to the comparing means on the basis of the signal indicative of the kind of access and the signal indicative of the outputting state of the virtual address, in the normal bus cycle.

The virtual address storage means for temporarily storing the virtual address of the trap circuit may comprise:

an instruction fetching page number storage means for storing the virtual page number for instruction fetching output in connection with access of the instruction fetch, among the virtual page numbers of the virtual address;

a data access page storage means for string the virtual page number for data access output in connection with the access of data, among the virtual page numbers of the virtual address;

the trap address setting means of the trap circuit comprises:

a trap page number setting means for setting the page number of the virtual address for trapping; and a trap offset setting means for setting the offset of the virtual address for trapping;

the comparing means in the trap circuit comprises:

a page number comparing means for comparing the page number of the virtual address and the trap page number of the trap page number setting means; and an offset comparing means for comparing the offset of the virtual address with the trap offset of the trap offset setting means.

Also, the virtual address storage means for temporarily storing the virtual address of the trap circuit may comprise:

an instruction fetching page number storage means for storing the virtual page number for instruction fetching output in connection with access of the instruction fetch, among the virtual page numbers of the virtual address;

a data access page storage means for string the virtual page number for data access output in connection with the access of data, among the virtual page numbers of the virtual address;

a setting means for outputting a set signal for storing the virtual address in the virtual address storage means, the setting means stores the virtual page number for instruction fetching output in connection with the access of instruction fetch in the instruction fetching page number storage means when the signal indicative of the kind of access indicates instruction fetch; and stores the virtual page number for data access output in connection with the access of data in the data access page number storage means when the signal indicative of the kind of access indicates data access. The virtual address selection output means for outputting the virtual address to the comparing means during normal bus cycle, may output one of the virtual page number of the instruction fetch page number storage means or the virtual page number of the data access page number storage means.

According to a further aspect of the invention, a debugging system for debugging employing a virtual address in a computer system comprises:

a microprocessor incorporating a virtual storage function and having a function for outputting a normal bus cycle corresponding to a real address in a normal operation and a function for outputting a debugging bus cycle corresponding to a virtual address output during debugging, the microprocessor outputting a signal indicative of a kind of access and a signal indicative of an outputting state of a virtual address during outputting of the virtual address in the debugging bus cycle;

a memory device connected to the microprocessor at least through an address bus and a data bus; and a bus monitoring device monitoring the bus cycle, address, transfer data, and other signals issued by the microprocessor and including a trace circuit for storing trace data including the virtual address and the transfer data in order when the signal indicative of the outputting state of the virtual address upon outputting of the virtual address from the microprocessor, and a trap circuit outputting a trap demand signal to the microprocessor at a time where a predetermined trap address matches with the virtual address in the normal bus cycle.

According to a still further aspect of the invention, a computer system with a debugging capability employing a virtual address, comprises:

a processor means for executing a programmed function including generation of a first bus cycle active in a normal mode operation of the processor means and a second bus cycle active in a debugging mode operation of the processor means;

a storage means for storing information necessary for operation of the processor means, the storage means being connected to the processor means at least through an address bus and a data bus; and a bus monitoring means for monitoring output of the processor means including the bus cycle and transfer data, the bus monitoring means including a debugging means for performing debugging process associated with the virtual address.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings.

DESCRIPTION OF THE PREFERRED EMBODIMENTS

Figure 1:
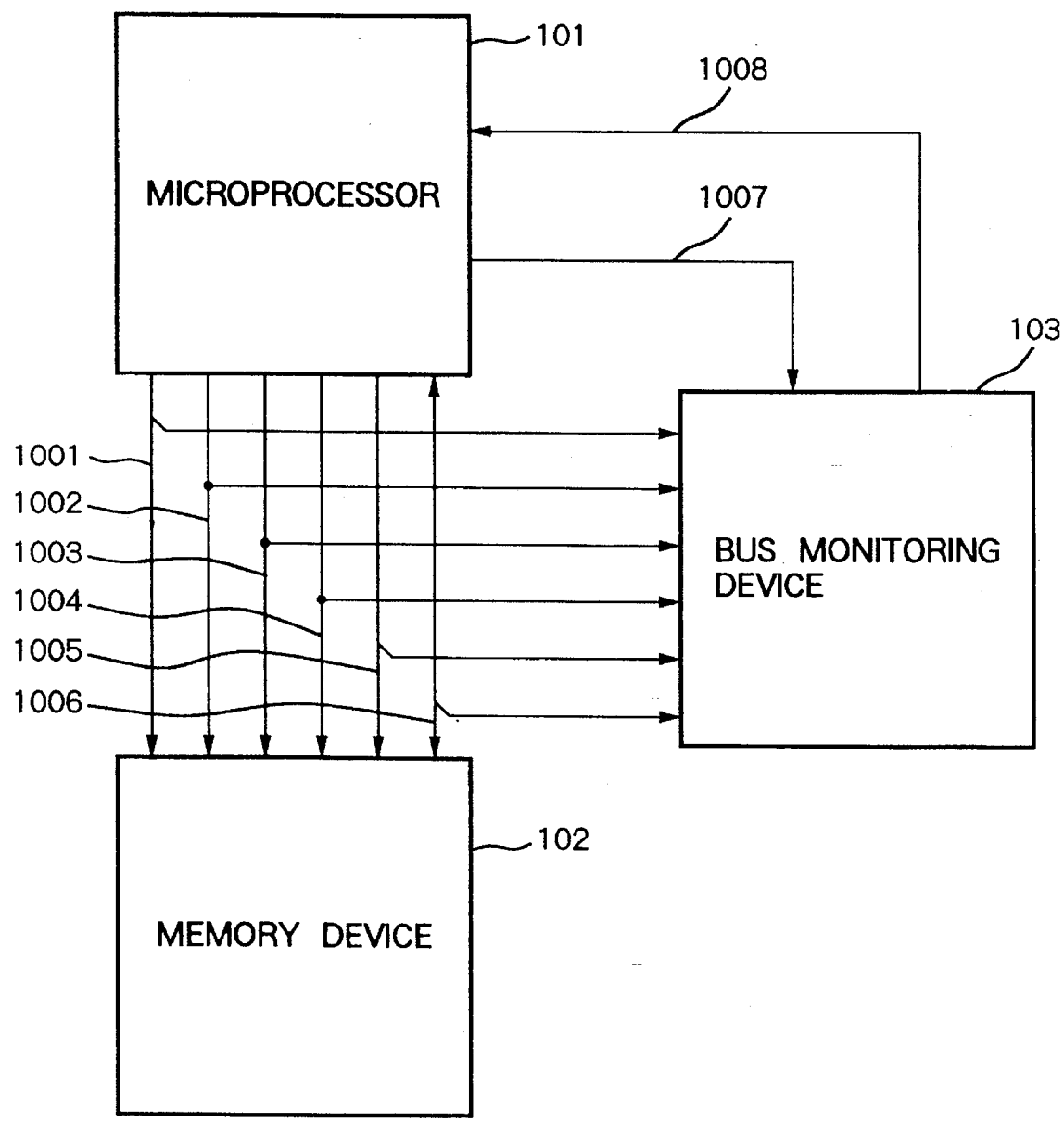
FIG. 1 is a block diagram showing the overall construction of the preferred embodiment of a debugging system according to the present invention.
Figure 6:
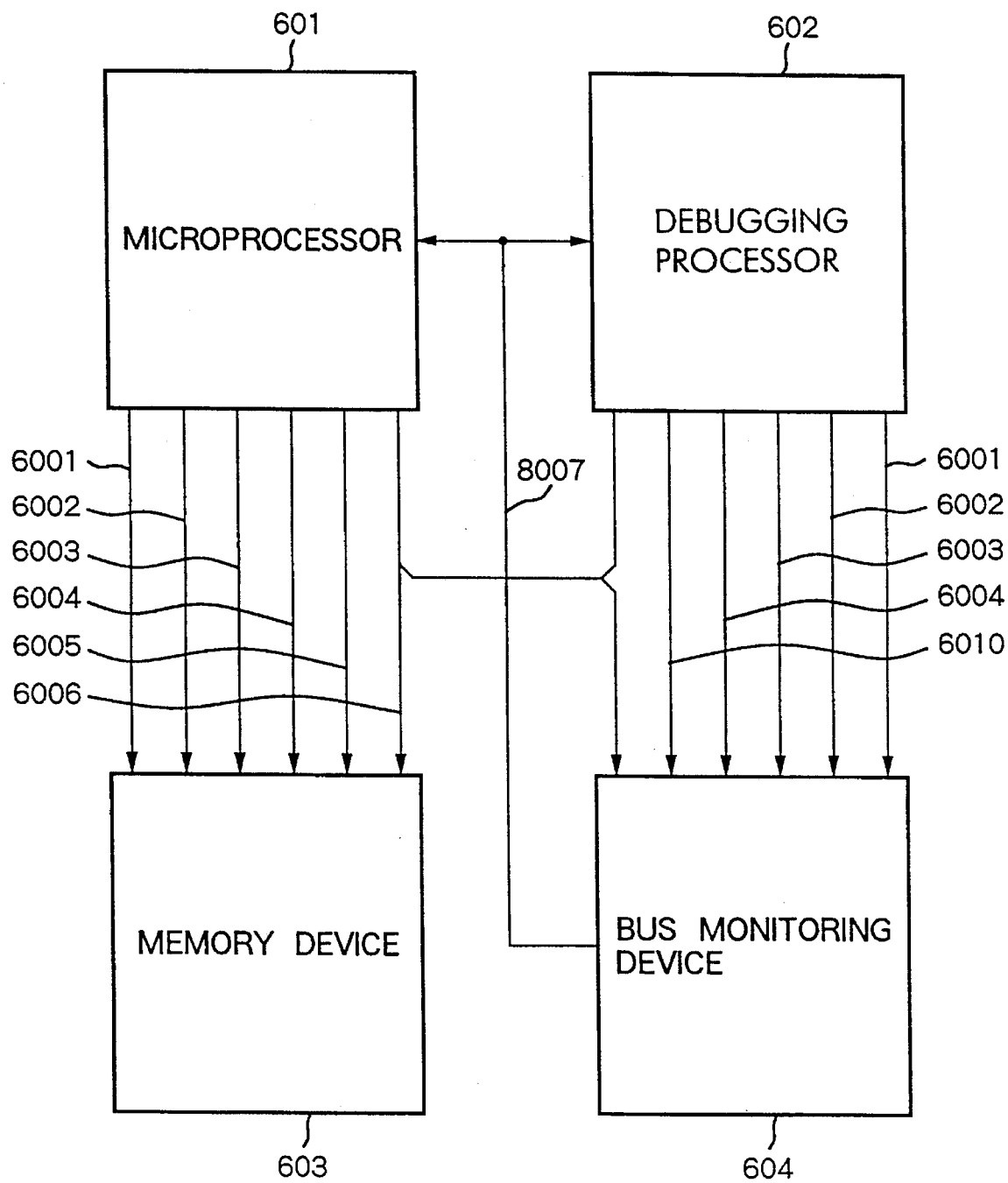
FIG. 6 is a block diagram showing the overall construction of the conventional debugging device.
Figure 7:
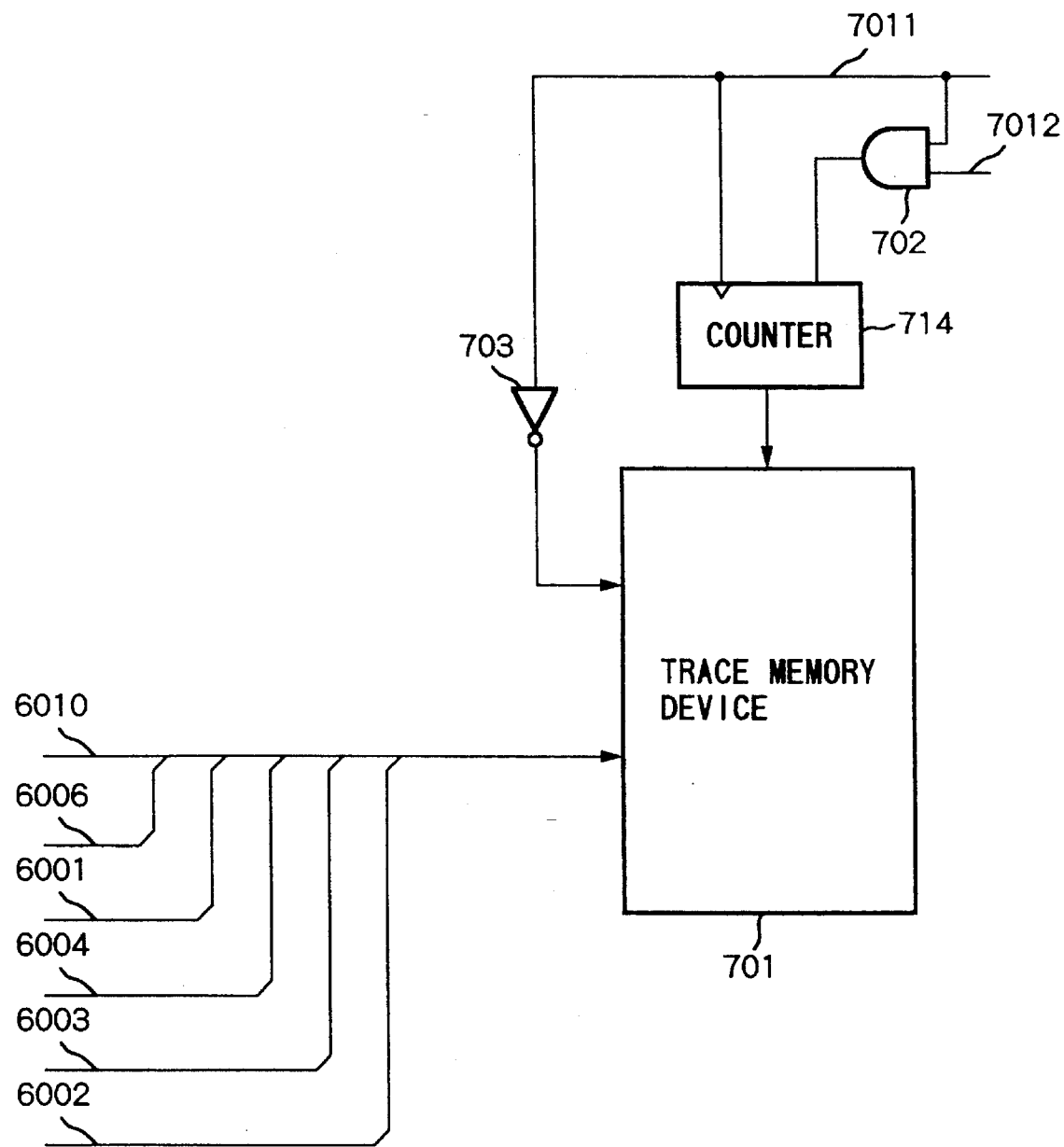
FIG. 7 is a block diagram showing the construction of the trace circuit incorporated in the bus monitoring device of the debugging system of FIG. 6.
Figure 8:
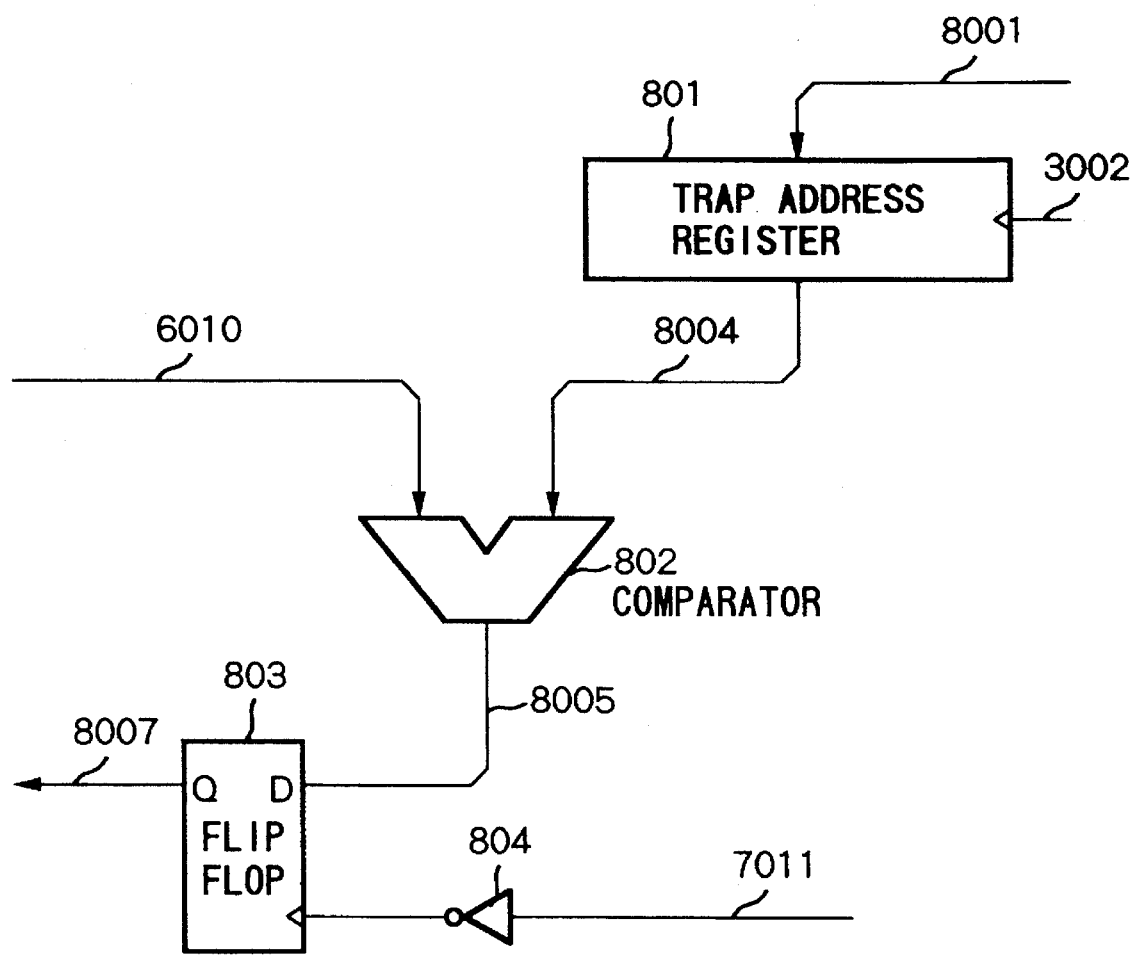
FIG. 8 is a block diagram showing the construction of the trap circuit in the bus monitoring device of the debugging system of FIG. 6.

The preferred embodiments of a debugging system according to the present invention will be discussed hereinafter in detail with reference to the accompanying drawings. FIG. 1 is a block diagram common to the first and second embodiment of the debugging system according to the present invention. In FIG. 1, the shown embodiment of the debugging system comprises a microprocessor 101 incorporating a virtual storage system, a memory device 102 and a bus monitoring device 103. In general, the feature of the construction of the shown embodiment is that the debugging processor presented in the prior art shown in FIGS. 6 is not included.

In FIG. 1. the virtual storage system employed in the microprocessor 101 takes a paging system with each page of 4K ($2^2$) bytes and has 4 G ($2^{32}$) bytes of virtual address space and real address space. Concerning the size of each page, the foregoing specific size should not serve as limiting but should be appreciated as being merely examplary. Namely, the page size can be selected in any way as long as practically useful. Also, the virtual storage system in the microprocessor 101 is not limited to the paging system but can be a segmentation system or so forth.

In the shown embodiment, 32 bit virtual address and real address are used. Among these 32 bit virtual address and real address, the upper 20 bit are handled as page number respectively and the lower 12 bits are taken as offset in the page (relative address in the page).

The microprocessor 101 is includes a function for outputting two kinds of bus cycle. A first bus cycle is a normal bus cycle. In this normal bus cycle, a real address necessary for normal operation in the microprocessor 101 is output to an address bus 1005.

A second bus cycle is a debug bus cycle. In this debug bus cycle, a virtual address is output to the address bus in advance of the real address.

Upon outputting of the virtual address, a signal 1001 indicative of a type of access and a signal 1007 indicative of outputting of the virtual address are output. On the other hand, in the debug bus cycle, an instruction fetch and data access are initiated only when a new page is accessed.

In the access of memory corresponding to fetch of an instruction code, the address becomes incremental (increased by a constant value) unless a branching operation is not effected. Therefore, once access is initiated for one page, access for the same page is continued until the page boundary is reached. By this, it becomes sufficient to add the debug bus cycle only when the access is made across the page boundary. Accordingly, between the case where only the normal bus cycle is used and the case where both of the normal bus cycle and the debug bus cycle are used, a difference of a throughput time of the overall system employing the microprocessor 101 can be reduced. By the, debugging can be performed under an environment close to a targeted microprocessor system.

On the other hand, detection of crossing of the page boundary can be made by detecting a difference of the page number between the page numbers of the virtual address for the last issued instruction fetch and data access and currently demanded instruction fetch and the data access. It should be noted that the construction of the microprocessor 101 similar to the microprocessor 101 has been disclosed in Japanese Unexamined Patent Publication No. 3-248245, in which is disclosed a microprocessor for performing tracing with a virtual/real address and for reducing the cost of a debugging system by indicating the virtual address to an address terminal by an output means in a first bus cycle generated by a control means. The disclosure of the above-identified publication is herein incorporated by reference.

In FIG. 1, the microprocessor 101 is connected to the memory device 102 via the address bus 1005 and a data bus 1006. To these address bus 1005 and the data bus 1006, not shown bus resource (e.g. an external storage device, such as a magnetic disc drive or other I/O devices and so forth) is connected to form one microprocessor application system.

Here, the reference numeral 1001 denotes the signal representing the type of access, 1002 denotes a read/write signal, 1003 denotes a data access signal, 1004 denotes a bus cycle start signal, 1007 denotes a signal indicative of under outputting of the virtual address, and 1008 denotes a trap demand signal.

In the microprocessor 101, only the bus cycle start signal 104 is output in the debug bus cycle. At this time, the data access signal 1003 is not output. On the other hand, in the memory device 102, the normal bus cycle and the debug bus cycle are distinguished by presence or absence of the data access signal 1003 from the microprocessor 101 so that erroneous data access will never occur. The read/write signal 1002 output from the microprocessor 101 represents read bus cycle while the level thereof is "1" and write bus cycle while the level thereof is "0".

The bus monitoring device 103 monitors the bus cycle of the microprocessor 101, synthesizes the virtual address and supports various debug functions. In the bus monitoring device 103, a group of registers for setting the virtual page number for instruction fetch which is output in connection with the access of the instruction fetch and the virtual page number for the data which is output in connection with the access of the data, among virtual addresses. In the microprocessor 101, since the virtual address is not output for access in the same page once the virtual address is output respectively for the instruction fetch and the data access, it becomes necessary to set the virtual page number for the instruction fetch and the data access respectively, in the debug device.

Figure 2:
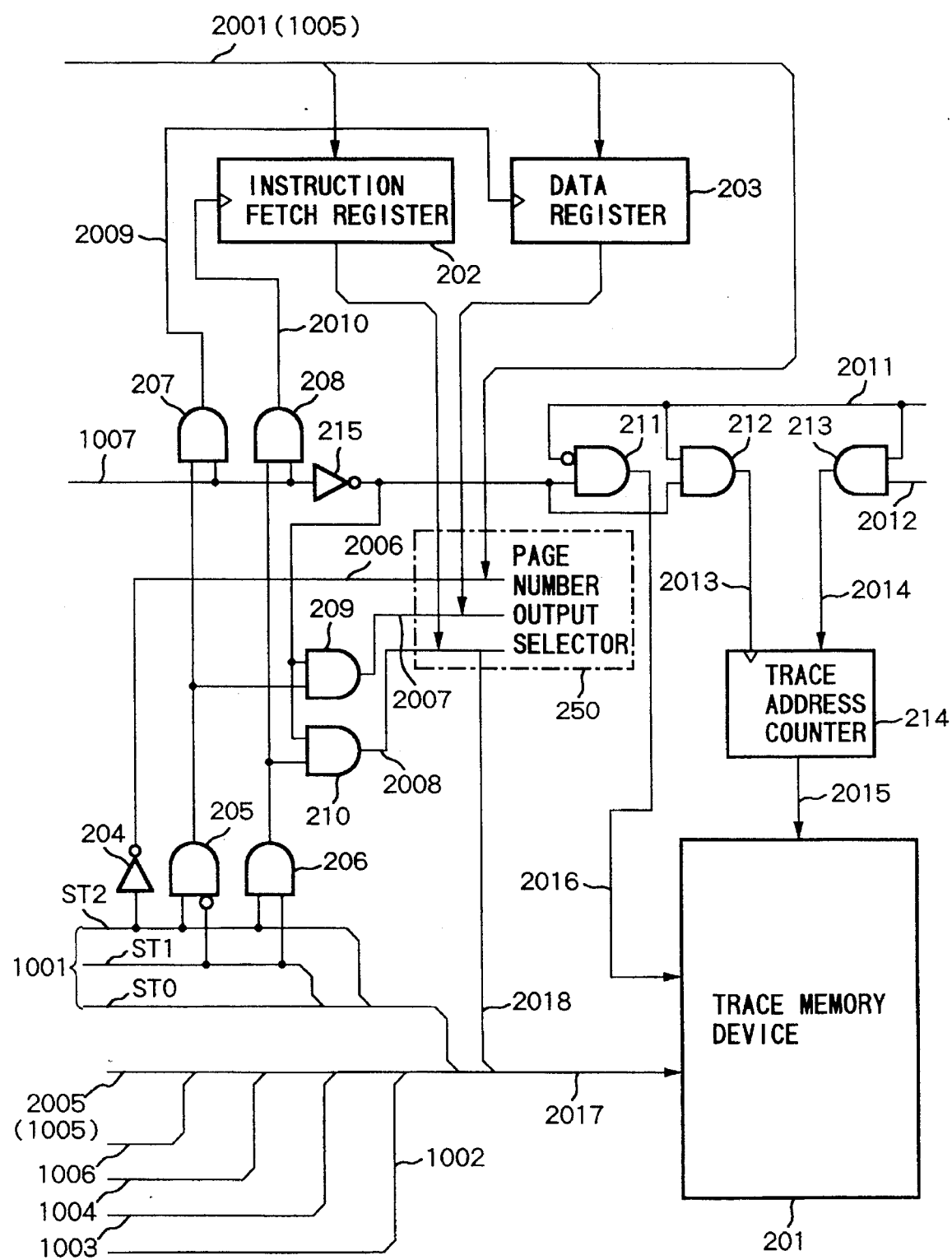
FIG. 2 is a block diagram showing a construction of a trace circuit to be incorporated in a bus monitoring system in the first embodiment of the debugging system of the invention.

FIG. 2 shows the construction of a tracing circuit incorporated in the bus monitoring circuit 103 in FIG. 1. The tracing circuit includes a tracing memory device 201 for storing a trace data, a instruction fetch register 202 for temporarily storing the virtual page number for the instruction fetch output in connection with the access of the instruction fetch, a data register 203 for temporarily storing the virtual page number for the data output in connection with the data access, and a trace address counter for outputting a trace address for the tracing memory 201 for designating the storage address for storing the trace data.

The address bus 1005 shown in FIG. 1 is constituted of a page number address bus 2001 and an offset address bus 2005. The page number address bus 2001 is connected to the instruction fetch register 202 and the data register 203.

On the other hand, the offset address bus 2005 is input to the trace memory device 201 together with the signal 1001 representing the access type, the read/write signal 1002, the data access signal 1003, the bus cycle start signal 1004, the data bus, and data bus 1006, as the trace data bus 2017.

The signal 1001 representing the access type includes signals ST0, ST1 and ST2. A relationship between the signal 1001 representing the access type and types of access to be designated is shows in the following table 1.

TABLE 1

| ST2 | ST1 | ST0 | Meaning |
|---|---|---|---|
| 0 | 0 | 0 | Stop |
| 0 | 0 | 1 | Virtual Table Access |
| 0 | 1 | 0 | Exception Table Access |
| 0 | 1 | 1 | Interrupt |
| 1 | 0 | 0 | Memory Data Access |
| 1 | 0 | 1 | I/O Data Access |
| 1 | 1 | 0 | Instruction Fetch After Branching |
| 1 | 1 | 1 | Instruction Fetch |

The signal ST2 of the signal 1001 representing of the access type is output via an inverter 204 as a page number output selection signal 2006. Inverted values of the signals ST2 and ST1 of the signal 1001 representing of the access type are input to an AND circuit 205. Similarly, the signals ST2 and ST1 are input to an AND circuit 206. The signal ST0 of the signal 1001 representing of the access type is input to the trace data bus 2017 as is.

The signal 1007 indicative of the virtual address outputting state and the output of the AND circuit 205 are input to an AND circuit 207. On the other hand, the signal indicative of the virtual address outputting state and the output of the AND circuit 206 are input to an AND circuit 208. The output of the AND circuit 207 is input to the data register 203 as a page number set signal 2009 for the data for setting the virtual page number of data access in the data register 203. The output of the AND gate 208 is input to the instruction fetch register 202 as a page number set signal 2010 for the instruction fetch so as to set the virtual page number of the instruction fetch to the instruction fetch register 202.

On the other hand, the inverted value of the signal 1007 indicative of the virtual address outputting state by an inverter 215 and the output of the AND circuit 205 is input to an AND circuit 209. On the other hand, the inverted value of the signal 1007 indicative of the virtual address outputting state by an inverter 215 and the output of the AND circuit 206 is input to an AND circuit 210.

The output of the AND circuit 209 serves as a page number output selection signal 2007. The output of the AND circuit 210 also serves as a page number output selection signal 2008.

The page number output selection signals 2006, 2007 and 2008 are input to a page number output selector 250 as selection signals. The inputs of the page number output selector 250 are thus the output of the instruction fetch register 202, the output of the data register 203 and the page number address bus 2001. On the other hand, the output of the page number output selector 250 is connected to the trace data bus 2017 as the page number internal bus 2018.

When the page number output selection signal 2006 is output, the page number which is input from the page number output selector 250 via the page number address bus, is output as is to the page number internal bus 2018. On the other hand, when the page number output selection signal 2007 is output, the page number stored in the data register 203 is output to the page number internal bus 2018. When the page number output selection signal 2008 is output, the page number stored in the instruction fetch register 202, is output to the page number internal bus 2018.

The inverted value of the signal 1007 from the inverter 215 and indicative of an outputting state of the virtual address and the inverted value of the clock 2001 are input to the AND circuit 211. The output of the AND circuit 211 serves as a trace data access signal 2016 for sampling the trace data transferred via the trace data bus 2017 for storing in the trace memory device 201.

Also, the inverted value of the signal 1007 from the inverter 215 and indicative of outputting state of the virtual address and the clock 2001 are input to the AND circuit 212. The output of the AND circuit 212 is input to a trace address counter 214 as a trace address increment signal 2013. By the trace address increment signal 2013, the trace address counter 214 is counted up.

On the other hand, the clock 2011 and a trace start signal 2012 are input to an AND gate 213. The output of the AND gate 213 is input to the trace address counter 214 as a trace address clear signal 2014.

With the construction set forth above, signals ST2 and ST1 included in the signal 1001 are indicative of the kind of access fed from the microprocessor 101 and the signal 1007, indicative of the outputting state of the virtual address, the page number setting signals 2010 and 2009 and the page number output selection signals 2008, 2007 and 2006 are generated.

The instruction fetch signal 2001 of the virtual page number becomes active during instruction fetching or instruction fetching after branching (namely, both signals ST2 and ST1 included in the signal 1001 indicative of the kind of access are "1"), and the virtual address being output (namely the signal 1007 indicative of the outputting state of the virtual address is active) in the microprocessor 101.

The data set signal 2009 of the virtual page number becomes active during memory data accessing or I/O data accessing (namely, both signals ST2 and ST1 included in the signal 1001 indicative of the kind of access are "0"), and the virtual address being output (namely the signal 1007 indicative of the outputting state of the virtual address is active) in the microprocessor 101.

The page number output selection signal 2007 for data becomes active during memory data accessing or I/O data accessing (namely, both signals ST2 and ST1 included in the signal 1001 indicative of the kind of access are "0"), and the real address being output (namely the signal 1007 indicative of the outputting state of the virtual address is inactive) in the microprocessor 101.

On the other hand, via the page number address bus 2001 included in the address bus 1005, the virtual page number and the real page number are input to the trace circuit of the bus monitoring device 103. When the instruction fetching set signal 2001 of the input virtual page number is active (namely, both of the signals ST2 and ST1 included in the signal 1001 indicative of the kind of access are "1" and the signal 1007 indicative of the outputting state of the virtual address is inactive), the page number is set.

The page numbers set in the instruction fetch register 202 and the data register 203 are output to the page number internal bus 2018 by the instruction page number output selection signal 2008 and the data page number output selection signal 2007.

On the other hand, with respect to the cycle, in which the virtual address and the real address match without performing the address conversion (stop, virtual table access, exception table (interrupt vector access, interrupt in the foregoing table 1), the other page number output selection signal 2006 becomes active for outputting the page number to the page number internal bus via the page number address bus 2001, as is.

In the trace memory device 201, the trace address of the trace address bus 2015 connected to the trace address bus counter 214 is incremented. When the trace data access 2016 becomes active, sampling for the data input via the trace data bus is performed.

A trace address increment signal 2013 input to the trace address counter 214 is input to the trace address counter 2013 in synchronism with the clock 2011. While the debug bus cycle is not running, the trace address is counted up. Therefore, the trace data stored internally in the trace memory device 201 can be eliminated from the storing to the trace data to the trace memory device 201.

The trace address clear signal 2014 is generated as an AND in the AND circuit 213 of the clock 2011 and the trace start signal 2012 and input to the trace address counter 214. By this, the trace data is stored from the leading address in the trace memory device 201 until the trace memory device 201 becomes full. The sampled trace data contents are the page number on the page number internal bus 2018 in the normal bus cycle, the data on the data bus 1006, the bus cycle start signal 1003 and the read/write signal 1002.

FIGS. 4(a) to 4(h) are timing charts showing signals at various portions of the shown embodiment of the debugging system, and respectively illustrate, in order, the clock 2011, the signal indicative of the outputting state of the virtual address, the signal 1001 indicative of the kind of access, the page number of the address bus 2001, the offset of the address bus 2005, the trace address access signal 2016. the trace address signal 2015 and the data on the trace data bus 2017.

Figure 4:
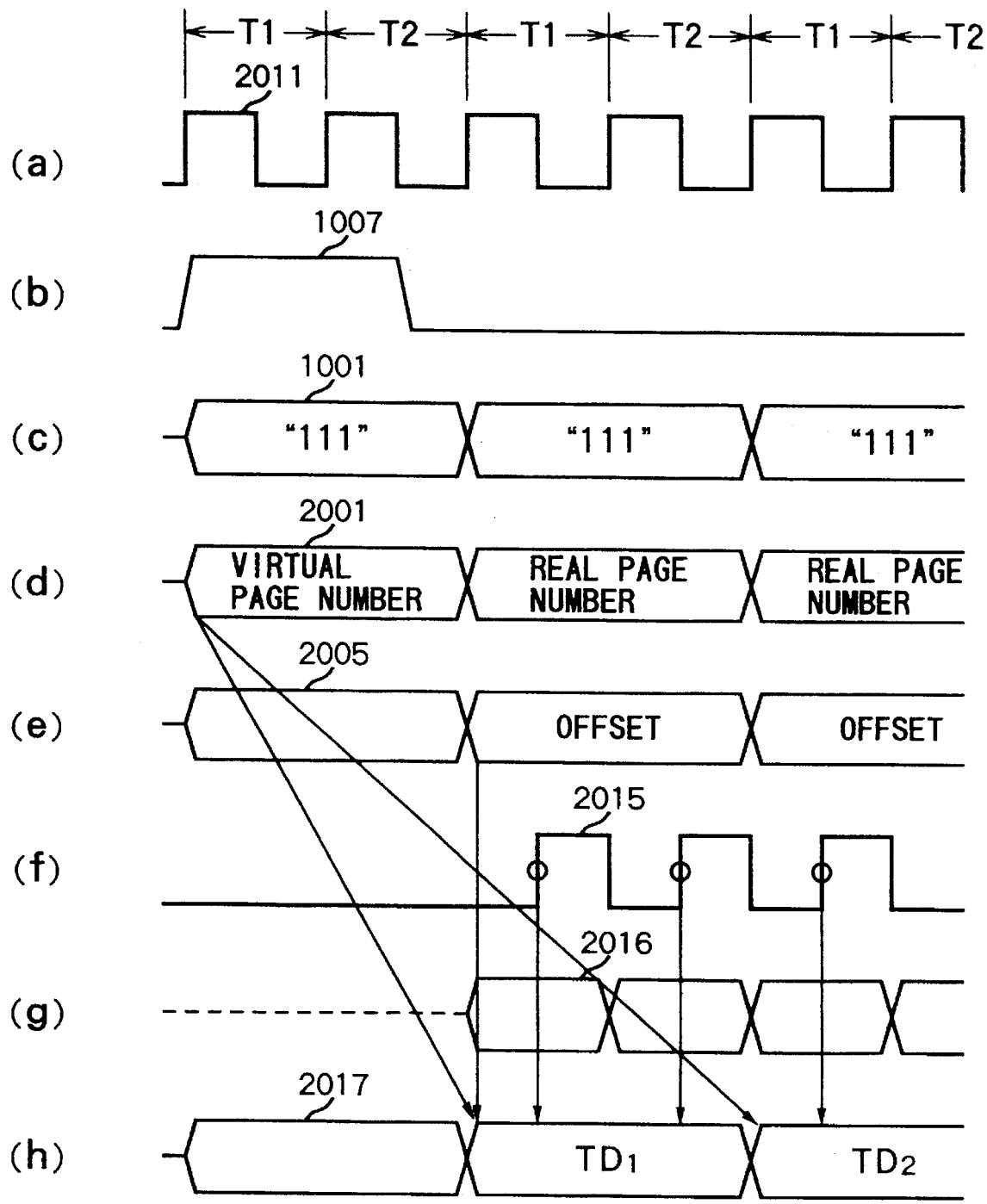
FIG. 4 is a timing chart for illustrating the operation of the trace circuit of FIG. 2.

As shown in FIG. 4(a), the bus cycle is consists of states respectively having clock widths of T1 and T2. If required, T2 may be repeated for extension. In FIG. 4, three sequential bus cycles are illustrated.

In the first bus cycle, since the signal 1007 indicative of the outputting state of the virtual address is active, the first cycle is the debug bus cycle. In the debug bus cycle, the signal 1001 indicative of the kind of access holds the binary value "111" (namely, ST2 is "1", ST1 is "1" and ST0 is "1"), and judgement can be made from the foregoing table 1 that the bus cycle is the one which is issued associated with instruction fetch for a new page.

In this debug cycle, the instruction fetch virtual page number of the address bus 2001 is set in the instruction fetch register 202 via the instruction set signal 2010 of the virtual page number.

In the second bus cycle, since the signal 1007 indicative of the outputting state of the virtual address is inactive, the bus cycle is the normal bus cycle. On the other hand, in this normal bus cycle, the signal 1001 indicative of the kind of access is held at the binary value "111" (namely, ST2 is "1", ST1 is "1" and ST0 is "1"), and judgement can be made that the current bus cycle is the one which is issued associated with an instruction fetch.

The trace data stored in the trace memory 201 are three data including TD1 in a T1 state, TD1 in a T2 state and TD2 in the T1 state. The page numbers contained in these trace data TD1 and TD2 are instruction fetch virtual page number set in the instruction fetch register 202 in the first debug bus cycle.

Other data contained in the trace data TD1 and TD2 is a data derived by sampling the data (data transmitted via the trace data bus 2017) with the trace data access signal 2016. The trace data access signal 2016 is a signal becoming active at the trailing edge of the clock of the normal bus cycle as shown in FIG. 4.

The programmer can easily make the trace with the virtual address by reading out the trace data stored in the trace memory device 201. By this, it becomes possible to perform debugging without paying attention to the difference between the real address and the virtual address.

Next, discussion will be given for the second embodiment of the debugging system according to the present invention. It should be noted that the overall construction of the debugging system is common to the first embodiment of FIG. 1. However, the second embodiment of the debugging system is adapted to perform debugging operation by the trap method in the bus monitoring device 103.

Figure 3:
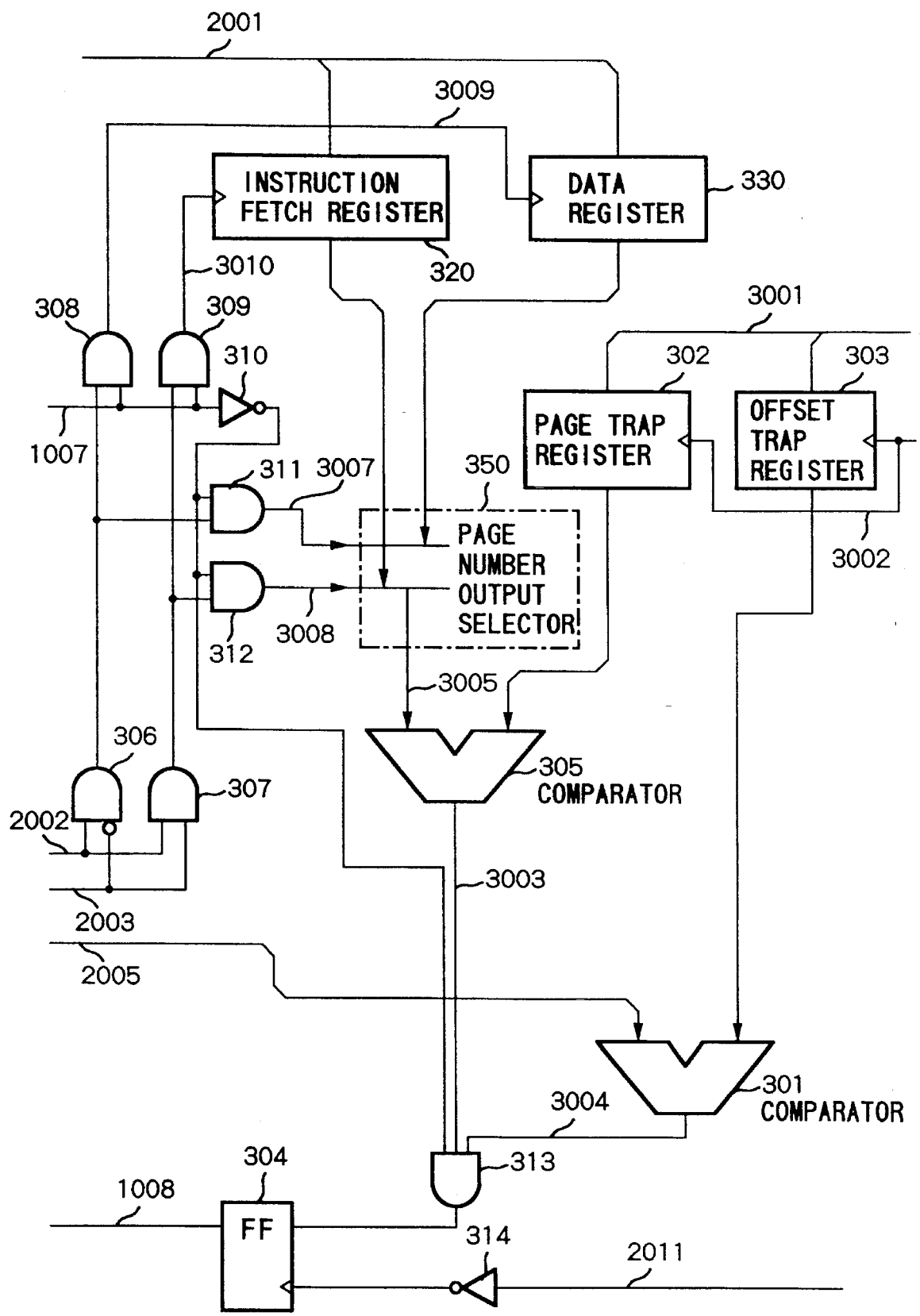
FIG. 3 is a block diagram showing a construction of a trap circuit to be incorporated in a bus monitoring system in the second embodiment of the debugging system of the invention.

FIG. 3 shows the construction of the trap circuit to be employed in the bus monitoring device 103. The trap circuit includes a page trap register 302 for setting the page number for enabling the programmer to perform trap, and an offset trap register 303 for setting the offset in the trapping operation. In addition, the trap circuit further includes a comparator 205 for comparing the virtual page number input via a page number internal bus 3005 and the output of the page trap register 302 and a comparator 301 for comparing the offset address input via an address bus 2005 and the output of the offset trap register 303. Furthermore, a flip flop 304 is provided as a function for outputting a trap demand signal for initiating the trapping operation for the microprocessor 101. Also, similarly to the foregoing first embodiment, an instruction fetch register 320 for temporarily storing the virtual page number for instruction fetch, which virtual page number is output associated with the instruction fetch, and a data register 330 for temporarily storing the virtual page number for the data output associated with the data access are provided.

The address bus 1005 illustrated in FIG. 1 is divided into the page number address bus 2001 and the offset address bus 2005. The page number address bus 2001 is connected respectively to the instruction fetch register 320 and the data register 330.

On the other hand, the offset address bus 2005 is input to one input of the comparator 301. The signal 1001 indicative of the kind of access contains the signals ST0, ST1 and ST2 shown in the foregoing table 1.

The inverted values of the signals ST2 and ST1 of the signal 101 indicative of the kind of access is input to an AND circuit 306. On the other hand, the signals ST2 and ST1 of the signal 1001 indicative of the kind of access are input to an AND circuit 307.

The signal 1007 indicative of the outputting state of the virtual signal and the output of the AND circuit 306 are input to an AND circuit 308. Also, the signal 1007 indicative of the outputting state of the virtual signal and the output of the AND circuit 307 are input to an AND circuit 309. The output of the AND circuit 308 is input to the data register 330 as the data page number setting signal for setting the virtual page number for the data access in the data register 330. Also, the output of the AND circuit 309 is input to the instruction fetch register 320 as the instruction fetch page set signal 3010 for setting the virtual page number in the instruction fetch register 320.

On the other hand, the inverted value of the signal 1007 indicative of the outputting state of the virtual address by an inverter 310 and the output 306 of the AND circuit 306 are input to an AND circuit 311. Also, the inverted value of the signal 1007 indicative of the outputting state of the virtual address and the output of the AND circuit 307 are input to an AND circuit 312.

The output of the AND circuit 311 is output as a page number output selection signal 3007. Similarly, the output of the AND circuit 312 is output as a page number output selection signal 2006. It should be noted, however, that the other page number output selection signal 2006 which is output in the first embodiment set forth above is not generated.

The page number output selection signals 3007 and 3008 are input as a selection signal to a page number input selector 350. The inputs of the page number input selector 350 are the output of the instruction fetch register 320 and the output of the data register 330. Also, the output of the page number output selector 350 is input to the comparator 305 as the page number internal bus 3005.

When the page number output selection signal 3007 is output, the page number stored in the data register 330 is output to the page number internal bus 3005. On the other hand, when the page number output selection signal 3008 is output, the page number stored in the instruction fetch register 320 is output to the page number internal bus 3005.

On the other hand, the trap address signal 3001 and the trap set signal 3002 are respectively connected to the page trap register 302 and an offset trap register 303. The output of the page trap register 303 is input to the comparator 305. The output of the offset trap register 303 is input to the comparator 301.

The inverted value of the signal 1007 indicative of the outputting state of the virtual address by the inverter 310, a virtual page number matching signal 3003 of the comparator 305 and an offset matching signal 3004 of the comparator 301 are input to the AND gate 313.

The output of the AND gate 313 is input to the flip flop 304. To the clock input of the flip flop 304, the inverted value of the clock 2001 by an inverter 314 is input. On the other hand, a trap demand signal 1008 from the flip flop 304 is output to the microprocessor 101.

Figure 5:
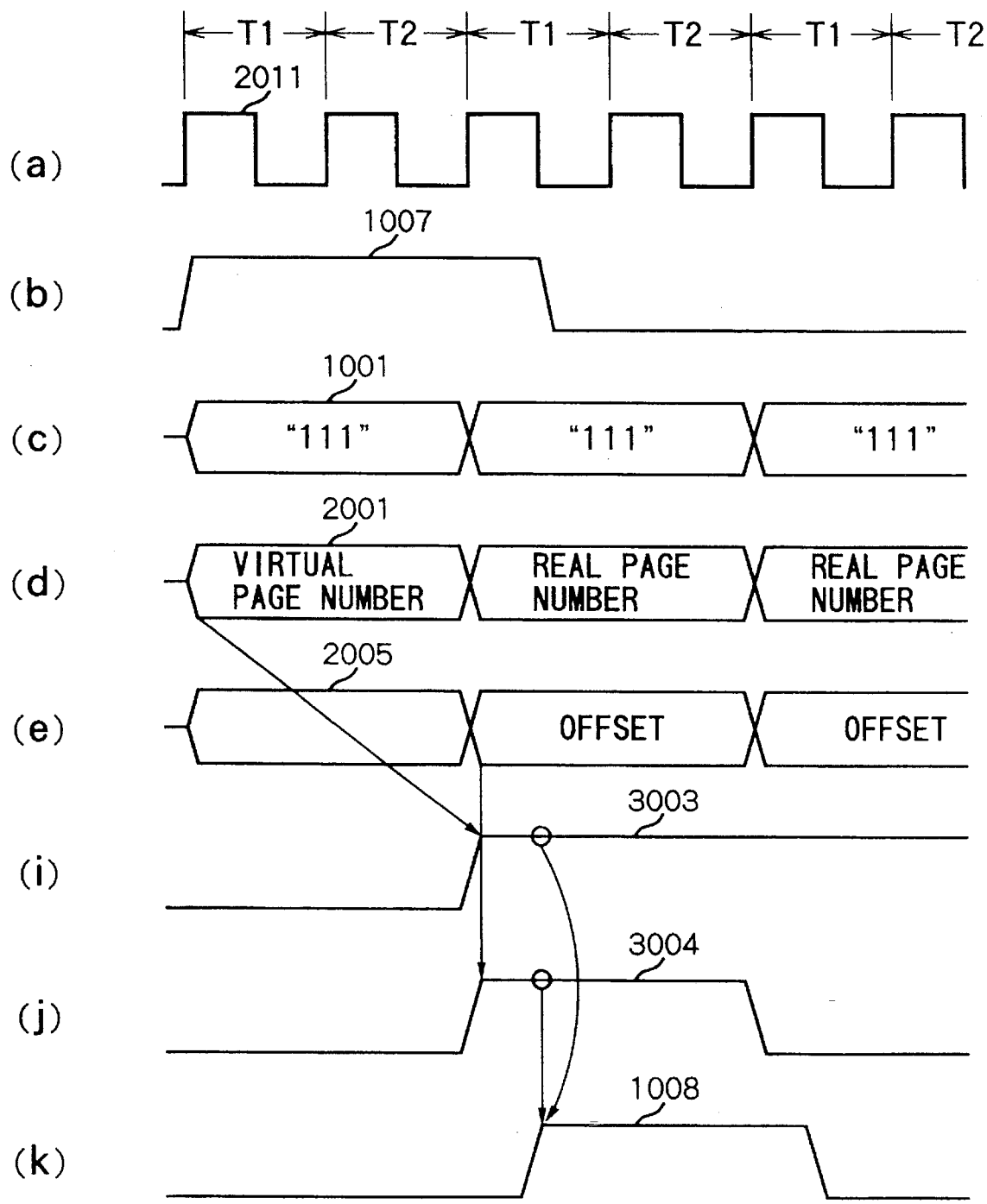
FIGS. 5(a) through 5(k) are timing charts for illustrating the operation of the trap circuit of FIG. 3.

The operation of the shown embodiment will be discussed with reference to the timing chart in FIGS. 5(*a*) to 5(*k*). The signals illustrated in FIGS. 5(*a*) to 5(*e*) are identical to those of FIG. 4. On the other hand, FIGS. 5(*i*), 5(*j*) and 5(*k*) are respectively the virtual page number matching signal 3003, the offset matching signal 3004 and the trap demand signal 1008. FIGS. 5(*a*) through 5(*k*) illustrate the step where the virtual address corresponding to the second normal bus cycle matches a trap address set by the programmer.

The trap address signal 3001 is separated into the page number and the offset and respectively input to the page trap register 302 and the offset trap register 303. At the timing of the leading edge of the trap set signal 3002, the page number and the offset in the trap address signal 3001 are set in respective corresponding registers.

The virtual page number matching signal 3003 is a signal indicative of the result of comparison of the page number of the trap address set in the page trap register 302 and the page number of the page number internal bus 3005. When both page numbers match, the virtual page number matching signal 3003 becomes active.

In the first debug bus cycle, the instruction fetch virtual page set in the instruction fetch register 320 is output to the page number internal bus 3005 in the second normal bus cycle.

Since the instruction fetch virtual page number of the instruction fetch register 320 and the trap page number of the page trap register 302 match, the instruction fetch virtual page is output in the second normal bus cycle by the page number internal bus 3005. In conjunction therewith, the virtual page number matching signal 3003 becomes active.

The offset matching signal 3004 is the signal indicative of the result of comparison between the trap offset set in the offset trap register 303 and the offset of the address bus 2005 in the normal bus cycle issued in the microprocessor 101. When both offsets match, the offset matching signal becomes active.

The trap demand signal 1008 output from the flip flop 304 is set at the trailing edge of the clock 2011 when the trap address and the virtual address of the microprocessor 101 match (both of the virtual page number matching signal 3003 and the offset matching signal 3004 are active) in the normal bus cycle, and fed to the microprocessor 101.

In the microprocessor 101, by inputting the trap demand signal 1008 as the trap signal, the programmer can perform the trapping operation with the virtual address for debugging.

It should be noted that although the foregoing discussion for the first and second embodiments are given for the case where the bus monitoring device 103 is provided only one of the trace circuit and the trap circuit, it is, of course, possible to provide both of the trace circuit and the trap circuit in the bus monitoring device 103.

As set forth above, according to the present invention, by employing the microprocessor which has a function to output two mutually distinct bus cycles, i.e. the debug bus cycle (virtual bus cycle) and the normal bus cycle, it becomes possible to monitor the bus cycle in the virtual address. Also, since it does not require a extra device, such as the debugging processor as required in the conventional system, the cost for the debugging system is lowered. On the other hand, the present invention can eliminate the problem associated with providing of the microprocessor and the debugging processor, in matching due to tolerance between the devices in the device production.

Although the invention has been illustrated and described with respect to exemplary embodiments thereof, it should be understood by those skilled in the art that the foregoing and various other changes, omissions and additions may be made therein and thereto, without departing from the spirit and scope of the present invention. Therefore, the present invention should not be understood as limited to the specific embodiments set out above but to include all possible embodiments which can be embodied within a scope encompassed and equivalents thereof with respect to the features set out in the appended claims.

What is claimed is:

1. A debugging system comprising:

a microprocessor operatively connected to a data bus and an address bus, said microprocessor including virtual storage means operatively connected to said data bus and said address bus, said virtual storage means providing a virtual storage with a plurality of virtual addresses, said microprocessor for outputting a real address on said address bus during a normal bus cycle and for outputting a virtual address of said plurality of virtual addresses on said address bus during a debugging bus cycle, said microprocessor further outputting a first signal indicative of a kind of access and a second signal indicative of an outputting state of said virtual address on said data bus during outputting of said virtual address in said debugging bus cycle, said microprocessor outputting transfer data and other data signals on said data bus;

a memory device connected to said microprocessor through said address bus and said data bus, for storing said transfer data and said other data in memory locations corresponding to said real address and said virtual address; and a bus monitoring device operatively connected to said data bus and said address bus, said bus monitoring device for monitoring, during the debugging bus cycle, said virtual address, said transfer data and said other data signals issued by said microprocessor.

said bus monitoring device including a trace circuit operatively connected to said data bus and said address bus, said trace circuit for storing trace data including the virtual address and the transfer data, in order, when said second signal indicates an outputting state of the virtual address from said microprocessor, said trace circuit comprising virtual address selection output means operatively connected to said address virtual storage means, said virtual selection output means outputting said virtual address stored in virtual storage means to trace data storage means, included in said trace circuit on the basis of the first signal and the second signal, during the normal bus cycle, wherein said trace circuit comprises:

trace data storage means operatively connected to said data bus and said address bus, said trace data storage means including virtual address storage means operatively connected to said microprocessor, said virtual address storage means storing said trace data;

said virtual address storage means temporarily holding said virtual address output in said debugging cycle;

setting means operatively connected to said virtual address storage means, said setting means being responsive to said first signal and said second signal, said setting means outputting a set signal to said virtual address storage means for controlling storing of said virtual address in said virtual address storage means;

trace address outputting means operatively connected to said trace data storage means, said trace address outputting means generating an address for storing said trace data in said trace data storage means, during said normal bus cycle; and means for outputting an access signal operatively connected to said trace data storage means, said access signal outputting means controlling storage of said trace data into said trace data storage means.

2. A debugging system as set forth in claim 1, wherein said virtual address storage means comprises:

instruction fetching page number storage means operatively connected to said virtual storage means, said instruction fetching page number storage means storing a first virtual page number for performing an instruction fetch from a plurality of virtual page numbers; and data accessing page number storage means operatively connected to said virtual storage means, said data accessing page number storage means storing a second virtual page number for accessing data from the plurality of virtual page numbers.

3. A debugging system as set forth in claim 1, wherein said virtual address storage means comprises:

instruction fetching page number storage means operatively connected to said address virtual storage means, said instruction fetching page number storage means storing a first virtual page number for performing an instruction fetch from a plurality of virtual page numbers; and data accessing page number storage means operatively connected to said virtual storage means, said data accessing page number storage means storing a second virtual page number for accessing data from the plurality of virtual page numbers;

said setting means storing said first virtual page number in said instruction fetching page number storage means when said first signal indicates instruction fetching and storing said second virtual page number in said data access page number storage means when said first signal indicates data access.

4. A debugging system as set forth in claim 3, wherein the virtual address selection output means outputs, to said trace data storage means, one of the first virtual page number, the second virtual page number and a third virtual page number, said third virtual page number corresponding to an access other than said instruction fetch and aid accessing data and corresponding to when said virtual address and said real address match.

5. A debugging system comprising:

a microprocessor operatively connected to a data bus and an address bus, said microprocessor including virtual storage means operatively connected to said data bus and said address bus, said virtual storage means providing a virtual storage with a plurality of virtual addresses, said microprocessor for outputting a real address on said address bus during a normal bus cycle and for outputting a virtual address of said plurality of virtual addresses on said address bus during a debugging bus cycle;

a memory device connected to said microprocessor through said address bus and said data bus for forming a system together with said microprocessor, for storing said transfer data and said other data in memory locations corresponding to said real address and said virtual address;

a bus monitoring device connected to said microprocessor through the address bus and the data bus, said bus monitoring device for monitoring the debugging bus cycle, said bus monitoring device including a trap circuit operatively connected to said data bus and said address bus, said trap circuit for outputting a predetermined trap address and a trap demand signal to said microprocessor when said predetermined trap address matches said virtual address during the normal bus cycle, wherein said microprocessor outputs a first signal indicative of a kind of access and a second signal indicative of an outputting state of said virtual address on said data bus during outputting of said virtual address in said debugging bus cycle; and said trap circuit comprising:

virtual address storage means operatively connected to said virtual storage means, said virtual address storage means temporarily storing said virtual address setting means operatively connected to said virtual address storage means, said setting means outputting a set signal for controlling storing of said virtual address into said virtual address storage means on the basis of the first signal and the second signal;

trap address storage means operatively connected to said microprocessor, said trap address storage means setting said trap address for trapping said microprocessor;

comparing means operatively connected to said virtual address storage means and said trap address storage means, said comparing means comparing the virtual address stored in said virtual address storage means and said trap address stored in said trap address storage means, during the normal bus cycle; and trap demand signal output means operatively connected to said comparing means, said trap demand signal output means outputting a trap demand signal to said microprocessor when said virtual address and said trap address match as a result of said comparing by said comparing means.

6. A debugging system as set forth in claim 5, which further comprises virtual address selection outputting means operatively connected to said virtual address storage means, said virtual address selection outputting means outputting the virtual address stored in said virtual address storage means to said comparing means on the basis of the first signal and the second signal, during the normal bus cycle.

7. A debugging system as set forth in claim 5, wherein said virtual address storage means comprises:

instruction fetching page number storage means operatively connected to said virtual storage means, said instruction fetching page number storage means storing a first virtual page number for performing an instruction fetch from a plurality of virtual page numbers;

data access page storage means operatively connected to said virtual storage means, said data access page storage means storing a second virtual page number for accessing data from the plurality of virtual page numbers, wherein the setting means comprises:

trap page number setting means operatively connected to said virtual storage means, said trap page number setting means setting a third virtual page number of said plurality of virtual page numbers wherein said third virtual page number includes said trap address, and trap offset setting means operatively connected to said virtual storage means, said trap offset setting means setting a first offset of the trap address;

wherein a fourth virtual page number of said plurality of virtual page numbers includes said virtual address and wherein said comparing means comprises:

page number comparing means operatively connected to said virtual storage means, said page number comparing means comparing the fourth virtual page number and the third virtual page number; and offset comparing means for comparing a second offset of said virtual address with the first offset.

8. A debugging device as set forth in claim 5, wherein said virtual address storage means comprises:

instruction fetching page number storage means operatively connected to said virtual storage means, said instruction fetching page number storage means storing a first virtual page number for performing an instruction fetch from a plurality of virtual page numbers;

data access page storage means operatively connected to said virtual storage means, said data access page storage means storing a second virtual page number for accessing data from the plurality of virtual page numbers, said setting means storing the first virtual page number in said instruction fetching page number storage means when the first signal indicates instruction fetch and storing the second virtual page number in said data access page number storage means when said first signal indicates data access.

9. A debugging system as set forth in claim 8, wherein said virtual address selection output means outputs one of the first virtual page number and the second virtual page number.

10. A debugging system comprising:

a microprocessor operatively connected to a data bus and an address bus, said microprocessor including virtual storage means operatively connected to said data bus and said address bus, said virtual storage means providing a virtual storage with a plurality of virtual addresses, said microprocessor for outputting a real address on said address bus during a normal bus cycle and for outputting a virtual address of said plurality of virtual addresses on said address bus during a debugging bus cycle, said microprocessor outputting transfer data and other data signals on said data bus;

a memory device connected to said microprocessor through said address bus and said data bus, for storing said transfer data and said other data in memory locations corresponding to said real address and said virtual address; and a bus monitoring device operatively connected to said data bus and said address bus, said bus monitoring device for monitoring, during the debugging bus cycle, said virtual address, said transfer data and said other data signals issued by said microprocessor, said bus monitoring device including a trace circuit operatively connected to said data bus and said address bus, said trace circuit for storing trace data including the virtual address and the transfer data, in order, when said second signal indicates an outputting state of the virtual address from said microprocessor, and said debugging system further including a trap circuit operatively connected to said data bus and said address bus, said trap circuit for outputting a predetermined trap address and a trap demand signal to said microprocessor when said predetermined trap address matches said virtual address during the normal bus cycle, wherein said microprocessor outputs a first signal indicative of a kind of access and a second signal indicative of an outputting state of said virtual address on said data bus during outputting of said virtual address in said debugging bus cycle, and said trace circuit comprises:

trace data storage means operatively connected to said data bus and said address bus, said trace data storage means including virtual address storage means operatively connected to said microprocessor, said virtual address storage means storing said trace data;

said virtual address storage means temporarily holding said virtual address output in said debugging cycle;

setting means operatively connected to said virtual address storage means, said setting means being responsive to said first signal and said second signal, said setting means outputting a set signal to said virtual address storage means for controlling storing of said virtual address in said virtual address storage means;

trace address outputting means operatively connected to said trace data storage means, said trace address outputting means generating an address for storing said trace data in said trace data storage means, during said normal bus cycle; and means for outputting an access signal operatively connected to said trace data storage means, said access signal outputting means controlling storage of said trace data into said trace data storage means.

11. A debugging system as set forth in claim 10, wherein said virtual address storage means comprises:

instruction fetching page number storage means operatively connected to said virtual storage means, said instruction fetching page number storage means storing a first virtual page number comprising instruction fetching output produced during an instruction fetch from a plurality of virtual page numbers; and data accessing page number storage means operatively connected to said virtual storage means, said data accessing page number storage means storing a second virtual page number comprising data access output produced during access of data among the plurality of virtual page numbers.

12. A debugging system comprising:

a microprocessor operatively connected to a data bus and an address bus, said microprocessor including virtual storage means operatively connected to said data bus and said address bus, said virtual storage means providing a virtual storage with a plurality of virtual addresses, said microprocessor for outputting a real address on said address bus during a normal bus cycle and for outputting a virtual address of said plurality of virtual addresses on said address bus during a debugging bus cycle, said microprocessor outputting transfer data and other data signals on said data bus;

a memory device connected to said microprocessor through said address bus and said data bus for storing said transfer data and said other data in memory locations corresponding to said real address and said virtual address; and a bus monitoring device operatively connected to said data bus and said address bus, said bus monitoring device for monitoring, during the debugging bus cycle, said virtual address, said transfer data and said other data signals issued by said microprocessor, said bus monitoring device including a trace circuit operatively connected to said data bus and said address bus said trace circuit for storing trace data including the virtual address and the transfer data, in order, when said second signal indicates an outputting state of the virtual address from said microprocessor, and said debugging system further including a trap circuit operatively connected to said data bus and said address bus, said trap circuit for outputting a predetermined trap address and a trap demand signal to said microprocessor when said predetermined trap address matches said virtual address during the normal bus cycle, wherein said microprocessor outputs a first signal indicative of a kind of access and a second signal indicative of an outputting state of said virtual address on said data bus during outputting of said virtual address in said debugging bus cycle, and said trap circuit comprises:

virtual address storage means operatively connected to said virtual storage means, said virtual address storage means temporarily storing said virtual address;

setting means operatively connected to said virtual address storage means, said setting means outputting a set signal for controlling storing of said virtual address into said virtual address storage means on the basis of the first signal and the second signal;

trap address storage means operatively connected to said microprocessor, said trap address storage means setting said trap address for trapping said microprocessor;

comparing means operatively connected to said virtual address storage means and said trap address storage means, said comparing means comparing the virtual address stored in said virtual address storage means and said trap address stored in said trap address storage means, during the normal bus cycle; and trap demand signal output means operatively connected to said comparing means, said trap demand signal output means outputting a trap demand signal to said microprocessor when said virtual address and said trap address match as a result of said comparing by said comparing means.

13. A debugging system as set forth in claim 12, wherein said virtual address storage means comprises:

instruction fetching page number storage means operatively connected to said virtual storage means, said instruction fetching page number storage means storing a first virtual page number for performing an instruction fetch from a plurality of virtual page numbers;

data access page storage means operatively connected to said virtual storage means, said data access page storage means storing a second virtual page number for accessing data from the plurality of virtual page numbers, wherein the setting means comprises:

trap page number setting means operatively connected to said virtual storage means, said trap page number setting means setting a third virtual page number of said plurality of virtual page numbers wherein said third virtual page number includes said trap address, and trap offset setting means operatively connected to said virtual storage means, said trap offset setting means setting a first offset of the trap address;

wherein a fourth virtual page number of said plurality of virtual page numbers includes said virtual address and wherein said comparing means comprises:

page number comparing means operatively connected to said virtual storage means, said page number comparing means comparing the fourth virtual page number and the third virtual page number; and offset comparing means for comparing a second offset of said virtual address with the first offset.

14. A debugging system as set forth in claim 15, wherein said virtual address storage means comprises:

instruction fetching page number storage means operatively connected to said virtual storage means, said instruction fetching page number storage means storing a first virtual page number for performing an instruction fetch from a plurality of virtual page numbers;

data access page storage means operatively connected to said virtual storage means, said data access page storage means storing a second virtual page number for accessing data from the plurality of virtual page numbers, said setting means storing the first virtual page number in said instruction fetching page number storage means when the first signal indicates instruction fetch and storing the second virtual page number in said data access page number storage means when said first signal indicates data access.

* * * * *